(12) United States Patent
Lee et al.

(10) Patent No.: US 10,774,163 B2
(45) Date of Patent: Sep. 15, 2020

(54) ETHYLENE/1-HEXENE COPOLYMER HAVING EXCELLENT PROCESSABILITY AND MECHANICAL PROPERTIES

(71) Applicant: LG Chem, Ltd., Seoul (KR)

(72) Inventors: Sung Min Lee, Daejeon (KR); Yi Young Choi, Daejeon (KR); Bog Ki Hong, Daejeon (KR); Soon Ho Sun, Daejeon (KR); Sun Mi Kim, Daejeon (KR); Jin Young Park, Daejeon (KR); Ki Soo Lee, Daejeon (KR)

(73) Assignee: LG Chem, Ltd. (KR)

( * ) Notice: Subject to any disclaimer, the term of this patent is extended or adjusted under 35 U.S.C. 154(b) by 91 days.

(21) Appl. No.: 16/087,119

(22) PCT Filed: Aug. 7, 2017

(86) PCT No.: PCT/KR2017/008512
§ 371 (c)(1),
(2) Date: Sep. 21, 2018

(87) PCT Pub. No.: WO2018/105848
PCT Pub. Date: Jun. 14, 2018

(65) Prior Publication Data
US 2019/0100611 A1    Apr. 4, 2019

(30) Foreign Application Priority Data

Dec. 9, 2016  (KR) .................. 10-2016-0167789

(51) Int. Cl.
*C08L 23/08*   (2006.01)
*C08F 210/16*  (2006.01)
*C08F 4/6592*  (2006.01)
*C08F 4/653*   (2006.01)
*C08F 4/659*   (2006.01)

(52) U.S. Cl.
CPC .......... *C08F 210/16* (2013.01); *C08F 4/6592* (2013.01); *C08F 4/65904* (2013.01); *C08L 23/08* (2013.01); *C08F 4/65912* (2013.01); *C08F 4/65916* (2013.01); *C08F 4/65925* (2013.01); *C08F 4/65927* (2013.01); *C08F 2420/06* (2013.01); *C08F 2500/04* (2013.01); *C08F 2500/08* (2013.01); *C08F 2500/12* (2013.01)

(58) Field of Classification Search
CPC .............. C08L 23/0815; C08F 4/65904; C08F 4/65925; C08F 4/65927; C08F 210/16
See application file for complete search history.

(56) References Cited

U.S. PATENT DOCUMENTS

| | | |
|---|---|---|
| 4,935,474 A | 6/1990 | Ewen et al. |
| 6,180,736 B1 | 1/2001 | Muhle et al. |
| 6,451,724 B1 | 9/2002 | Nifant'ev et al. |
| 6,683,150 B1 | 1/2004 | Meverden et al. |
| 6,841,631 B2 | 1/2005 | Loveday et al. |
| 6,894,128 B2 | 5/2005 | Loveday et al. |
| 6,911,508 B2 | 6/2005 | McCullough |
| 7,449,533 B2 | 11/2008 | Kawai et al. |
| 9,090,761 B2 | 7/2015 | Mannebach et al. |
| 2003/0148877 A1 | 8/2003 | Nifant'ev et al. |
| 2005/0131171 A1 | 6/2005 | Tohi et al. |
| 2005/0228155 A1 | 10/2005 | Kawai et al. |
| 2007/0213205 A1 | 9/2007 | Mihan |
| 2007/0255033 A1 | 11/2007 | Kipke et al. |
| 2008/0045679 A1 | 2/2008 | Davey et al. |
| 2008/0171651 A1 | 7/2008 | Tohi et al. |
| 2008/0286509 A1 | 11/2008 | Kipke et al. |
| 2009/0062488 A1 | 3/2009 | Nagy et al. |
| 2010/0311925 A1 | 12/2010 | Mihan |
| 2011/0281722 A1 | 11/2011 | Kipke et al. |
| 2011/0282012 A1 | 11/2011 | Kipke et al. |
| 2015/0126692 A1 | 5/2015 | Sukhadia et al. |
| 2015/0299352 A1 | 10/2015 | Sohn et al. |
| 2016/0168281 A1 | 6/2016 | Lee et al. |
| 2016/0280813 A1 | 9/2016 | Kwon et al. |
| 2016/0280822 A1 | 9/2016 | Kim et al. |
| 2017/0044278 A1 | 2/2017 | Lee et al. |
| 2017/0233511 A1 | 8/2017 | Sun et al. |
| 2018/0194883 A1 | 7/2018 | Kim et al. |
| 2018/0223009 A1 | 8/2018 | Kim et al. |

FOREIGN PATENT DOCUMENTS

| | | |
|---|---|---|
| CN | 105754019 A | 7/2016 |
| JP | 2006083371 A | 3/2006 |
| JP | 2007218324 A | 8/2007 |
| JP | 4540755 B2 | 9/2010 |
| KR | 20040038781 A | 5/2004 |
| KR | 100746676 B1 | 8/2007 |
| KR | 101357895 B1 | 2/2014 |
| KR | 101437509 B1 | 9/2014 |
| KR | 20150015789 A | 2/2015 |
| KR | 101592436 B1 | 2/2016 |
| KR | 20160029704 A | 3/2016 |
| KR | 20160029718 A | 3/2016 |
| KR | 20160043516 A | 4/2016 |
| KR | 20160069462 A | 6/2016 |
| KR | 20160123123 A | 10/2016 |
| KR | 20160123172 A | 10/2016 |
| KR | 101692346 B1 | 1/2017 |
| KR | 20170106192 A | 9/2017 |
| WO | 2005103095 A1 | 11/2005 |
| WO | 2016036204 A1 | 3/2016 |

OTHER PUBLICATIONS

International Search Report for PCT/KR2017/008512, dated Nov. 28, 2017.
Miller et al., "Mechanism of Isotactic Polypropylene Formation with C1-Symmetric Metallocene Catalysts", vol. 25, No. 15, Organometallics, Jul. 2006, pp. 3576-3592.
Extended European Search Report including the Written Opinion for Application No. EP 17878041.7 dated May 14, 2019.

*Primary Examiner* — Caixia Lu

(74) *Attorney, Agent, or Firm* — Lerner, David, Littenberg, Krumholz & Mentlik, LLP

(57) ABSTRACT

The ethylene/1-hexene copolymer according to the present invention has excellent processability and mechanical properties, and thus can be applied to various fields such as food containers.

6 Claims, No Drawings

ETHYLENE/1-HEXENE COPOLYMER HAVING EXCELLENT PROCESSABILITY AND MECHANICAL PROPERTIES

CROSS-REFERENCE TO RELATED APPLICATIONS

The present application is a national phase entry under 35 U.S.C. § 371 of International Application No. PCT/KR2017/008512 filed Aug. 7, 2017, which claims priority from Korean Patent Application No. 10-2016-0167789 filed Dec. 9, 2016, the disclosures of which are incorporated herein by reference.

TECHNICAL FIELD

The present invention relates to an ethylene/1-hexene copolymer having excellent processability and mechanical properties.

BACKGROUND ART

In the case of resins used for food containers and the like, excellent processability and mechanical properties are required. Accordingly, there is a continuing need for techniques relating to the preparation of a polyolefin which satisfies a large molecular weight, a broader molecular weight distribution, desirable comonomer distribution and the like, and thus can be preferably used in a container, a bottle cap, or the like since before.

On the other hand, since metallocene catalysts including a Group 4 transition metal are used to easily control the molecular weight and molecular weight distribution of polyolefins, and control a comonomer distribution of polymers, compared to existing Ziegler-Natta catalysts, they have been used in the preparation of polyolefins having improved mechanical properties and processability at the same time. However, there is a drawback that polyolefins prepared using the metallocene catalysts exhibit poor processability because of a narrow molecular weight distribution.

In general, polymers having broad molecular weight distribution exhibit great reduction in viscosity with an increasing shear rate, and thus exhibit excellent processability in the processing area. Polyolefins prepared by metallocene catalysts exhibit high viscosity at a high shear rate due to a relatively narrow molecular weight distribution, etc., and thus there are drawbacks that a high load or pressure is applied during extrusion to reduce extrusion productivity, bubble stability is greatly reduced upon a blow-molding process, and the blow-molded articles have non-uniform surfaces to reduce transparency.

Accordingly, a cascade reactor having a plurality of reactors has been used in order to obtain a polyolefin having a broad multimodal molecular weight distribution using the metallocene catalyst, and attempts have been made to obtain a polyolefin satisfying a broader multimodal molecular weight distribution and a higher molecular weight at the same time through each polymerization step in a plurality of reactors.

However, proper polymerization does not occur in a latter reactor depending on a polymerization time in a former reactor due to high reactivity of the metallocene catalyst. As a result, there were limits to prepare a polyolefin satisfying a sufficiently high molecular weight and a broader multimodal molecular weight distribution at the same time. Accordingly, there is a continuous demand for a technology capable of more effectively preparing a polyolefin which has a high molecular weight and a broader multimodal molecular weight distribution, thereby satisfying mechanical properties and processability at the same time and being preferably used for products.

U.S. Pat. No. 6,180,736 describes a method for producing a polyethylene in a single gas phase reactor or continuous slurry reactor using one metallocene catalyst. When this method is used, there is advantages in that the production cost of a polyethylene is lowered, fouling hardly occurs, and the polymerization activity is stable. In addition, U.S. Pat. No. 6,911,508 describes the production of a polyethylene with improved rheological properties, polymerized in a single gas phase reactor using a new metallocene catalyst compound and 1-hexene as a comonomer. However, the polyethylene produced in the above patents also has disadvantages in that it has a narrow molecular weight distribution, and hardly exhibits sufficient impact strength and processability.

U.S. Pat. No. 4,935,474 describes a method for producing a polyethylene having a broad molecular weight distribution by using two or more metallocene compounds. In addition, U.S. Pat. Nos. 6,841,631 and 6,894,128 describe that polyethylene having a bimodal or multimodal molecular weight distribution is produced by using a metallocene-type catalyst including at least two metal compounds, and thus it can be used in various applications such as films, pipes, hollow molded articles, etc. However, the polyethylene produced in this way has improved processability, but has disadvantages in that, since the distribution state by molecular weight in the unit particle is not uniform, the appearance is rough, and the physical properties are not stable even under relatively good processing conditions.

Given the above circumstances, there is a continuing need for production of more excellent resins, having a balance between various physical properties, or between various physical properties and processability, and further research thereon is needed.

SUMMARY OF THE INVENTION

Technical Problem

In order to address the problems of the prior art, the present invention provides an ethylene/1-hexene copolymer having excellent processability and mechanical properties.

Technical Solution

In order to achieve the above objects, the present invention provides an ethylene/1-hexene copolymer having the following features:

a weight average molecular weight is 90,000 to 300,000;
a density (g/cm$^3$) is 0.950 to 0.965;
a molecular weight distribution is 5 to 20;
a melt flow rate ratio (MFR$_{21.6}$/MFR$_5$, measured by ASTM 1238 at 190° C.) is 3 to 10; and
a spiral flow (cm) is 13 to 30.

Generally, a polymer produced by a metallocene catalyst has a trade-off relationship between processability and mechanical properties depending on the weight average molecular weight. That is, when the weight average molecular weight is higher, the mechanical properties are improved, but the processability is decreased. In contrast, when the weight average molecular weight is lower, the processability is improved, but the mechanical properties are decreased. In the case of a polymer used in a food container or a bottle cap, it should have excellent mechanical properties and excellent processability at the same time.

Accordingly, the present invention is characterized in that mechanical properties and processability are simultaneously improved by introducing a long chain branch (LCB) into an ethylene/1-hexene copolymer using a metallocene catalyst as described below.

First, the ethylene/1-hexene copolymer according to the present invention has a weight average molecular weight of 90,000 to 300,000. Preferably, the weight average molecular weight is 95,000 or more, and 290,000 or less, 280,000 or less, 270,000 or less, 260,000 or less, 250,000 or less, 240,000 or less, 230,000 or less, 220,000 or less, 210,000 or less, or 200,000 or less.

Further, the ethylene/1-hexene copolymer according to the present invention has a density (g/cm³) of 0.950 to 0.965. Preferably, the density (g/cm³) is 0.951 or more, or 0.952 or more, and 0.964 or less, 0.963 or less, 0.962 or less, 0.961 or less, or 0.960 or less.

In addition, the ethylene/1-hexene copolymer according to the present invention has a molecular weight distribution of 5 to 20. The molecular weight distribution refers to a value obtained by dividing a weight average molecular weight by a number average molecular weight. Preferably, the molecular weight distribution is 6 or more, 7 or more, 8 or more, 9 or more, or 10 or more, and 19 or less, 18 or less, 17 or less, 16 or less, 15 or less, 14 or less, 13 or less, 12 or less, or 11 or less.

Further, the ethylene/1-hexene copolymer according to the present invention has a melt flow rate ratio ($MFR_{21.6}$/$MFR_5$, measured by ASTM 1238 at 190° C., respectively) of 3 to 10. The melt flow rate ratio refers to a value obtained by dividing the $MFR_{21.6}$ measured by ASTM 1238 at 190° C. by the $MFR_5$ measured by ASTM 1238 at 190° C. Preferably, the melt flow rate ratio is 4 or more, or 5 or more, and 9 or less, or 8 or less.

Further, the ethylene/1-hexene copolymer according to the present invention has an $MFR_{2.16}$ (measured by ASTM 1238 under a load of 2.16 kg at 190° C.) of 0.01 to 1.0 g/10 min. Preferably, the $MFR_{2.16}$ (g/10 min) is 0.02 or more, 0.03 or more, 0.04 or more, or 0.05 or more, and 0.9 or less, 0.8 or less, 0.7 or less, 0.6 or less, 0.5 or less, 0.4 or less, or 0.3 or less.

In addition, the ethylene/1-hexene copolymer according to the present invention has a spiral flow length of 13 to 30 cm. The spiral flow length can be evaluated by the method in that a polymer is injected by applying a specific pressure and temperature to a spiral mold, and it is determined how much the molten and injected ethylene/1-hexene copolymer is pushed out. As in one embodiment of the present invention described below, the measurement of the present invention is carried by using a mold having a thickness of 1.5 mm, and setting the injection temperature to 190° C., the mold temperature to 50° C., and the injection pressure to 90 bar. Preferably, the spiral flow length (cm) is 14 or more, or 15 or more, and 29 or less, 28 or less, 27 or less, 26 or less, 25 or less, 24 or less, 23 or less, 22 or less, 21 or less, or 20 or less.

Further, in the ethylene/1-hexene copolymer according to the present invention, the ratio between the monomers is not particularly limited, and can be appropriately selected depending on the use, purpose, etc. of the copolymer. More specifically, the molar ratio between ethylene and 1-hexene monomer may be 1:100 to 100:1.

The ethylene/1-hexene copolymer as described above may be prepared by copolymerizing ethylene and 1-hexene in the presence of a catalyst composition comprising a compound represented by the following Chemical Formula 1.

[Chemical Formula 1]

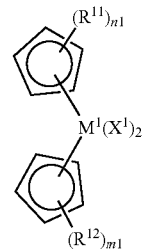

in Chemical Formula 1,
$M^1$ is a Group 4 transition metal;
$X^1$ is each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;
n1 and m1 are each independently an integer of 1 to 4; and
$R^{11}$ and $R^{12}$ are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl; with the proviso that at least one of $R^{11}$ is $C_{2-20}$ alkoxyalkyl.

The substituents of the chemical formula will be described in more detail below.

The $C_{1-20}$ alkyl includes a linear or branched alkyl, and specifically includes, but is not limited to, methyl, ethyl, propyl, isopropyl, n-butyl, tert-butyl, pentyl, hexyl, heptyl, octyl, etc.

The $C_{2-20}$ alkenyl includes a linear or branched alkenyl, and specifically includes, but is not limited to, allyl, ethenyl, propenyl, butenyl, pentenyl, etc.

The $C_{6-20}$ aryl includes a monocyclic or fused cyclic aryl, and specifically includes, but is not limited to, phenyl, biphenyl, naphthyl, phenanthrenyl, fluorenyl, etc.

The $C_{1-20}$ alkoxy includes, but is not limited to, methoxy, ethoxy, phenyloxy, cyclohexyloxy, etc.

Preferably, $R^{11}$ and $R^{12}$ are each independently hydrogen, methyl, or 6-(tert-butoxy)hexyl, with the proviso that at least one of $R^{11}$ and $R^{12}$ is 6-(tert-butoxy)hexyl.

According to one embodiment of the present invention, specific examples of the compound represented by Chemical Formula 1 include compounds represented by one of the following structural formulas.

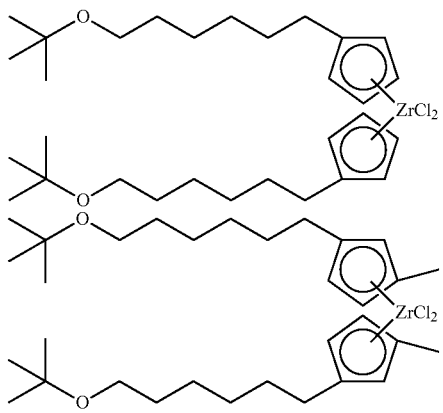

-continued

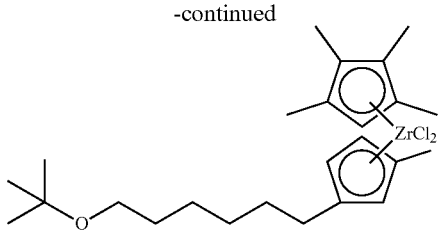

Further, the catalyst composition may further comprise one or more of compounds represented by the following Chemical Formulas 2 to 4 for controlling the weight average molecular weight of the ethylene/1-hexene copolymer to be produced.

[Chemical Formula 2]

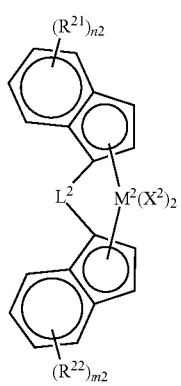

in Chemical Formula 2,
$M^2$ is a Group 4 transition metal;
$X^2$ is each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;
$L^2$ is $C_{1-10}$ alkylene;
n2 and m2 are each independently an integer of 1 to 4; and
$R^{21}$ and $R^{22}$ are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl,

[Chemical Formula 3]

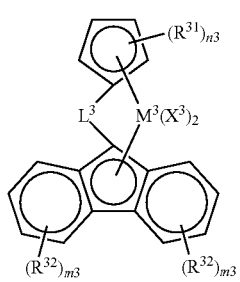

in Chemical Formula 3,
$M^3$ is a Group 4 transition metal;
$X^3$ is each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;
$L^3$ is $Si(R^{34})(R^{35})$, wherein $R^{34}$ and $R^{35}$ are each independently $C_{1-20}$ alkyl, or $C_{1-10}$ alkoxy;

n3 and m3 are each independently an integer of 1 to 4; and
$R^{31}$ and $R^{32}$ are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl,

[Chemical Formula 4]

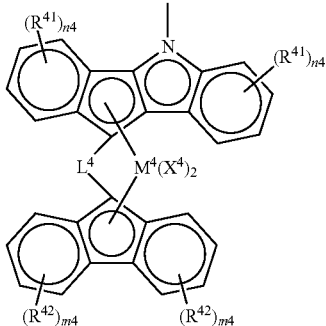

in Chemical Formula 4,
$M^4$ is a Group 4 transition metal;
$X^4$ is each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate; $L^4$ is $Si(R^{44})(R^{45})$, wherein $R^{44}$ and $R^{45}$ are each independently $C_{1-20}$ alkyl, or $C_{1-10}$ alkoxy, with the proviso that at least one of $R^{44}$ and $R^{45}$ is 6-(tert-butoxy)hexyl;
n4 and m4 are each independently an integer of 1 to 4; and
$R^{41}$ and $R^{42}$ are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl.

The weight average molecular weight of the ethylene/1-hexene copolymer can be increased by including any one or more of the compounds represented by Chemical Formulas 2 to 4, and the effect of increasing the weight average molecular weight of the compound represented by Chemical Formula 3 is greater than that of the compound represented by Chemical Formula 2, and that of the compound represented by Chemical Formula 4 is greater than that of the compound represented by Chemical Formula 3.

Preferably, the compound represented by Chemical Formula 2 is as follows.

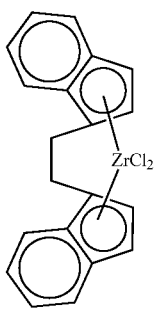

Preferably, the compound represented by the formula 3 is as follows.

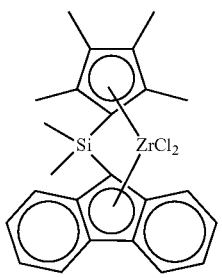

Preferably, the compound represented by the formula 4 is as follows.

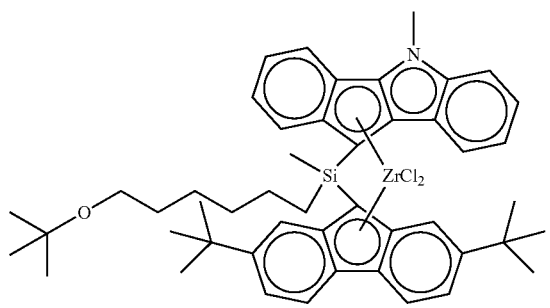

In addition, the weight ratio of the compound represented by Chemical Formula 1 to any one or more of the compound represented by Chemical Formulas 2 to 4 is not particularly limited, and it may have a weight ratio of 1:100 to 100:1.

In addition, the catalyst composition may further comprise a compound represented by the following Chemical Formula 5 in order to control the weight average molecular weight of the ethylene/1-hexene copolymer to be produced.

[Chemical Formula 5]

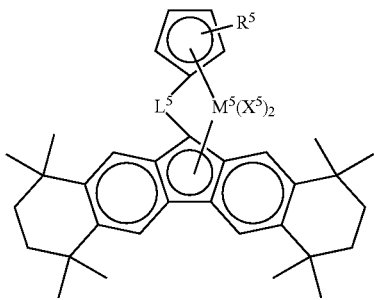

in Chemical Formula 5, $M^5$ is a Group 4 transition metal;

$X^5$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$L^5$ is $C_{1-10}$ alkylene; and $R^5$ is $C_{1-10}$ alkoxy.

The weight average molecular weight of the ethylene/1-hexene copolymer can be further increased by including the compound represented by Chemical Formula 5.

Preferably, the compound represented by Chemical Formula 5 is as follows.

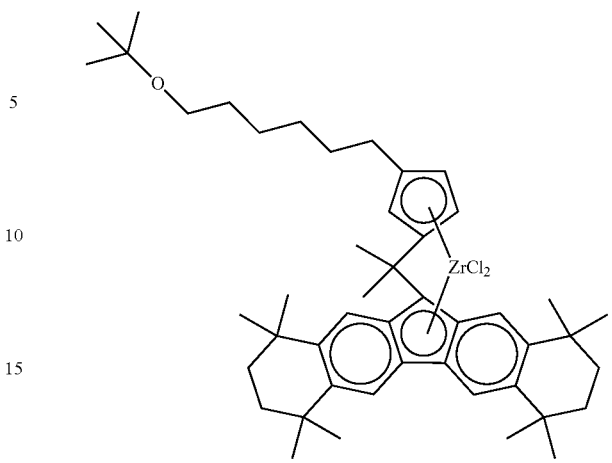

Further, the weight ratio of the compound represented by Chemical Formula 1 to the compound represented by the formula 5 is not particularly limited, and it may have a weight ratio of 1:100 to 100:1.

In addition, the catalyst composition may be supported on a support, and may comprise a cocatalyst to activate the catalyst in the catalyst composition.

The cocatalyst is an organometallic compound containing a Group 13 metal, and is not particularly limited as long as it can be used in the polymerization of an olefin in the presence of a general metallocene catalyst.

Specifically, the cocatalyst compound may include one or more of a first aluminum-containing co-catalyst of the following Chemical Formula 6 and a second borate-based co-catalyst of the following Chemical Formula 7.

—[Al(R$_{18}$)—O—]$_k$—  [Chemical Formula 6]

in Chemical Formula 6, $R_{18}$ is each independently a halogen, a halogen-substituted or unsubstituted hydrocarbyl group having 1 to 20 carbon atoms, and k is an integer of 2 or more, T$^+$[BG$_4$]$^-$  [Chemical Formula 7]

in Chemical Formula 7, T$^+$ is a +1 valent polyatomic ion, B is boron in an oxidation state of +3, and G is each independently selected from the group consisting of hydride, dialkylamido, halide, alkoxide, aryloxide, hydrocarbyl, halocarbyl, and halo-substituted hydrocarbyl, wherein the G has 20 or less carbon atoms, with the proviso that G is halide at one or less position.

The first cocatalyst of Chemical Formula 6 may be an alkylaluminoxane-based compound wherein the repeating units are combined into a linear, circular or network form. Specific examples of the first co-catalyst include methylaluminoxane (MAO), ethylaluminoxane, isobutylaluminoxane, butylaluminoxane, or the like.

Further, the second cocatalyst of Chemical Formula 7 may be a borate-based compound in the form of a trisubstituted ammonium salt, or a dialkylammonium salt, or a trisubstituted phosphonium salt. Specific examples of the second co-catalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl) ammonium tetraphenylborate, methyltetradecyclooctadecylammonium tetraphenylborate, N,N-dimethylanilinium tetraphenylborate, N,N-diethylanilinium tetraphenylborate, N, N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N, N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N, N-diethylanilinium tetrakis(2,3,4,6-tetrafluorophenyl)borate, N, N-dimethyl-(2,4,6-trimethylanilinium)tetrakis-(2,3,4,6-tetrafluorophenyl)borate, or the like; a borate-based compound in the form of a dialkylammonium salt, such as dioctadecylammonium tetrakis(pentafluorophenyl)borate, ditetradecylammonium tetrakis(pentafluorophenyl) borate, dicyclohexylammonium tetrakis(pentafluorophenyl)borate, or the like; or a borate-based compound in the form of a trisubstituted phosphonium salt, etc., such as triphenylphosphonium tetrakis(pentafluorophenyl)borate, methyldioctadecylphosphonium tetrakis(pentafluorophenyl)borate, tri(2,6-dimethylphenyl)phosphonium tetrakis(pentafluorophenyl)borate, or the like.

When the support is used, the weight ratio of the catalyst composition to the support may be 1:10 to 1:1,000. Also, when the cocatalyst compound is used, the weight ratio of the cocatalyst compound to the support may be 1:1 to 1:100.

A support containing a hydroxy group on the surface can be used as the support, and preferably, a support containing a hydroxy group and a siloxane group having high reactivity, which is dried to remove moisture on its surface, can be used.

For example, silica, silica-alumina, silica-magnesia, and the like, which are dried at high temperature, may be used and they may usually contain oxides, carbonates, sulfates, and nitrate components such as $Na_2O$, $K_2CO_3$, $BaSO_4$, and $Mg(NO_3)_2$.

The drying temperature of the support is preferably 200 to 800° C., more preferably 300 to 600° C., and most preferably 300 to 400° C. When the drying temperature of the support is lower than 200° C., it retains moisture so much that moisture on the surface is reacted with the co-catalyst. When the drying temperature is higher than 800° C., pores on the surface of the support are combined with each other, thereby reducing surface area, and a number of hydroxyl groups are lost on the surface, thereby remaining only siloxane groups. Thereafter, the reactive sites with co-catalyst are reduced, which is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, drying conditions, such as temperature, time, vacuum, or spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

On the other hand, in the polymerization of ethylene and 1-hexene in the presence of the catalyst composition, the ethylene/alpha-olefin copolymer according to the present invention can be produced by polymerizing ethylene and alpha-olefin in the presence of the above-described supported metallocene catalyst.

The polymerization can be carried out by copolymerizing ethylene and alpha-olefin using one continuous slurry polymerization reactor, a loop slurry reactor, a gas phase reactor or a solution reactor.

In addition, the polymerization temperature may be about 25 to about 500° C., preferably about 25 to about 200° C., and more preferably about 50 to about 150° C. Also, the polymerization pressure may be about 1 to about 100 $Kgf/cm^2$, preferably about 1 to about 50 $Kgf/cm^2$, more preferably about 5 to about 30 $Kgf/cm^2$.

The supported metallocene catalyst may be introduced by dissolving or diluting it in an aliphatic hydrocarbon solvent having 5 to 12 carbon atoms, such as pentane, hexane, heptane, nonane, decane and isomers thereof, an aromatic hydrocarbon solvent, such as toluene and benzene, a hydrocarbon solvent substituted with a chlorine atom, such as dichloromethane and chlorobenzene, and the like. The solvent used here is preferably used after a small amount of water, air, or the like, acting as a catalyst poison is removed by treatment with a small amount of alkylaluminum, and it is also possible to use further co-catalyst.

Advantageous Effects

The ethylene/1-hexene copolymer according to the present invention has excellent processability and mechanical properties, and thus can be applied to various fields such as food containers.

DETAILED DESCRIPTION OF THE EMBODIMENTS

Hereinafter, preferred examples of the present invention will be described for the purpose of facilitating understanding of the present invention. However, these examples are given for illustrative purposes only and the scope of the present invention is not limited by the examples.

Preparation Example 1: Preparation of Precursor A

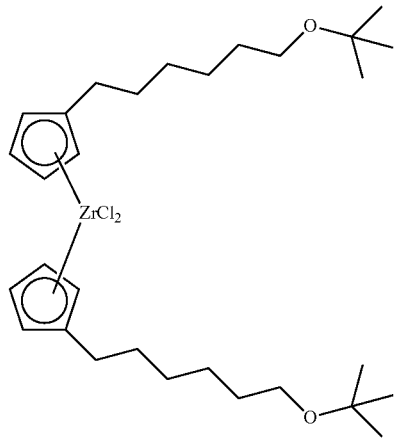

t-Butyl-O—(CH$_2$)$_6$—Cl was prepared by using 6-chlorohexanol according to the method described in Tetrahedron Lett. 2951 (1988), and NaCp was reacted therewith to obtain t-Butyl-O—(CH$_2$)$_6$—C$_5$H$_5$ (60% yield, b.p. 80° C./0.1 mmHg). Further, t-Butyl-O—(CH$_2$)$_6$—C$_5$H$_5$ was dissolved in THF at −78° C., normal butyl lithium (n-BuLi) was slowly added thereto, warmed up to room temperature and then allowed to react for 8 hours. The previously synthesized lithium salt solution was slowly added again to a suspension solution of ZrCl$_4$(THF)$_2$ (1.70 g, 4.50 mmol)/THF (30 mL) at −78° C., and further reacted at room temperature for 6 hours. All volatile materials were dried under vacuum, a hexane solvent was added to the obtained oily liquid material and filtered. The filtered solution was dried under vacuum, and hexane was then added thereto to induce precipitation at a low temperature (−20° C.). The obtained precipitates were filtered at a low temperature to obtain a compound [tBu-O—(CH$_2$)$_6$—C$_5$H$_4$]$_2$ZrCl$_2$ in the form of a white solid (92% yield).

$^1$H NMR (300 MHz, CDCl3): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl3): 135.09, 116.66, 112.28, 72.42, 61.52, 30.66, 30.61, 30.14, 29.18, 27.58, 26.00.

Preparation Example 2: Preparation of Precursor B

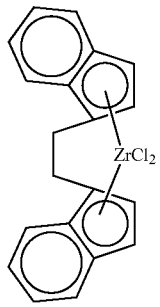

All materials were commercially available from Sigma-Aldrich (Cas No.: 100080-82-8).

Preparation Example 3: Preparation of Precursor C

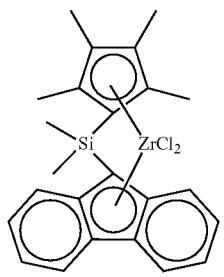

To a dried 250 mL schlenk flask was added 1.622 g (10 mmol) of fluorine, and 200 mL of THF was introduced thereto under argon. The THF solution was cooled down to 0° C., and then 4.8 mL (12 mmol) of 2.5 M n-BuLi hexane solution was slowly added dropwise. The reaction mixture was slowly warmed up to room temperature and stirred until the next day. To another 250 mL schlenk flask were added 1.2 mL (10 mmol, Fw 129.06, d 107 g/mL) of dichlorodimethylsilicone and 30 mL of hexane, the schlenk flask was cooled down to −78° C., and then lithiated solution was added dropwise thereto. After the addition was completed, the mixture was slowly warmed up to room temperature and stirred for one day. At the same time, 10 mmol of tetramethylcyclopentadiene was cooled down to 0° C. under THF dyddao, then 4.8 mL (12 mmol) of 2.5 M n-BuLi hexane solution was slowly added dropwise and subjected to lithiation reaction for one day. The next day, chloro(9H-fluoren-9-yl)dimethylsilane and lithiated 4-methylcyclopentadiene flask were combined with cannula at room temperature. At this time, the direction supplied to the cannula does not affect the experiment. After stirring for one day, 50 mL of water was added to the flask, quenched, the organic layer was separated and dried over MgSO$_4$. Thereby, 3.53 g (10.25 mmol, 100%) of ligand of a yellow powder was obtained.

NMR standard purity (wt %)=100%
Mw=344.56

$^1$H NMR (500 MHz, CDCl3): −0.36 (6H, s), 1.80 (6H, s), 1.94 (6H, s), 3.20 (1H, s), 4.09 (1H, s), 7.28-7.33 (4H, m), 7.52 (2H, d), 7.83 (2H, d)

The ligand synthesized above was added to a 250 mL schlenk flask dried in an oven and dissolved in diethylether. Then, 2.1 equivalents (21.5 mmol, 8.6 mL) of n-BuLi solution was added thereto, and subjected to lithiation until the next day. The next day, the solvent diethylether was all evaporated under vacuum, and then hexane slurry was filtered through a schlink filter to obtain ligands in the form of a Li salt (yellow solid). This filtered Li salt was added to a new 250 mL schlenk flask, and a suspension containing 50 mL of toluene was prepared. In addition, 1 equivalents of ZrCl$_4$ (THF)$_2$ was taken in a glove box and added to a 250 mL schlenk flask, and a suspension containing toluene was prepared. The above two flasks were cooled down to −78° C., and then ligand anion was slowly added to the Zr suspension. After the addition was completed, the reaction mixture was slowly warmed up to room temperature. After stirring for one day, toluene in the mixture was immediately filtered through a schlink filter under argon to obtain 3.551 g (6.024 mmol, 61.35% Yield) of catalyst precursor in the form of a filter cake.

NMR standard purity (wt %)=85.6% (residual LiCl)
Mw=504.68

$^1$H NMR (500 MHz, CDCl3): 1.30 (6H, s), 1.86 (6H, s), 1.95 (6H, s), 7.21 (2H, m), 7.53 (2H, m), 7.65 (2H, m), 8.06 (2H, m)

Preparation Example 4: Preparation of Precursor D

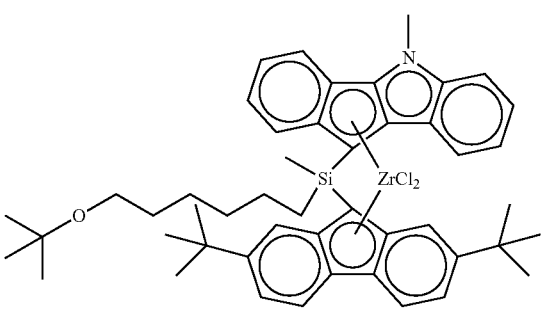

2.8 g (10 mmol) of ditertbutylfluorene was dissolved in 4.8 mL of MTBE and 90 mL of hexane, 6.4 mL of 2.5 M n-BuLi hexane solution was added dropwise in an ice bath and stirred at room temperature overnight. 2.7 g (10 mmol) of the Si bridge compound was dissolved in 50 mL of hexane, the Flu-Li slurry was transferred into a dried ice/acetone bath for 30 minutes and stirred at room temperature overnight. At the same time, 2.3 g (10 mmol) of indenoindole was also dissolved in 50 mL of THF, 8.0 mL (20 mmol) of 2.5 M n-BuLi hexane solution was added dropwise into a dried ice/acetone bath, and stirred at room temperature overnight. Si reaction solution was sampled and dried. Then, the completion of the reaction was confirmed by NMR sampling in a glove box, and the indenoindole-Li solution was transferred in a dried ice/acetone bath. And the mixture was stirred at room temperature overnight. After the reaction, the mixture was extracted with ether/water and the residual moisture of the organic layer was dried over $MgSO_4$. The mixture obtained by filtering was evaporated under vacuum-reduced pressure to remove the solvent. Thereby, 7.3 g (10.3 mmol, 103%) of ligand was obtained.

$^1$H NMR (500 MHz, d-benzene): −0.03, −0.04 (3H, d). 0.46-0.90 (6H, m), 1.06 (2H, m), 1.13 (9H, s), 1.28-1.33 (18H, m), 1.62 (2H, m), 2.49 (3H, s), 3.22 (2H, m), 3.35, 3.54 (1H, d), 3.75 (1H, d), 4.15 (1H, d), 7.02 (1H, d), 7.10 (2H, m), 7.19-7.49 (8H, m), 7.71 (1H, m), 7.78-7.86 (2H, m)

4 equivalents of MTBE and 80 mL of toluene were used as the solvent for the metallization, and 2.4 g (28.0%) of purple solid was obtained from 7.3 g (10.3 mmol) of the ligand.

NMR standard purity (wt %)=100%
Mw=856.2
$^1$H NMR (500 MHz, CDCl3): 0.96 (9H, s), 1.17 (9H, s), 1.28-1.62 (4H, m), 1.66 (3H, s), 1.82 (2H, m), 2.08 (2H, m), 2.23 (2H, m), 2.49 (3H, s), 3.35 (2H, t), 3.88 (3H, s), 6.73 (1H, t), 7.12 (3H, s), 7.25 (1H, d), 7.46 (2H, m), 7.61-7.68 (3H, m), 7.74 (1H, s), 7.84 (2H, m)

Preparation Example 5: Preparation of Precursor E

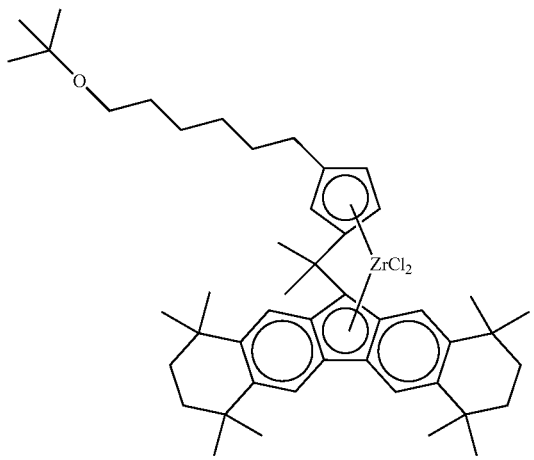

To a dried 250 mL schlenk flask were added 10.78 g (48.5 mmol) of 2-(6-tert-butoxyhexyl)cyclopenta-1,3-diene and 7.1 mL (2+ equiv.) of acetone in methanol solvent under argon. The solution was cooled down to 0° C. and 5.17 g (1.5 equiv., 72.7 mmol) of pyrrolidine was added dropwise. The reaction mixture was slowly warmed up to room temperature and stirred until the next day. 50 mL of water and acetic acid were added to the flask, stirred for about 30 minutes, and then worked up with ether. The organic layer was separated and dried over $MgSO_4$ to obtain 8.2 g (31.25 mmol) of 2-(6-tert-butoxyhexyl)-5-(propan-2-ylidene)cyclopenta-1,3-diene. This was confirmed by NMR to be pure (64.4% yield).

Under argon, 3.866 g (10 mmol) of 1,1,4,4,7,7,10,10-octamethyl-2,3,4,7,8,9,10,12-octahydro-1H-dibenzo[b,h]fluorine was prepared in another 250 mL schlenk flask and dissolved in 40 mL of THF. The solution was cooled down to 0° C. and 4.8 mL (12 mmol) of 2.5 M n-BuLi hexane solution was added dropwise. The reaction mixture was slowly warmed up to room temperature and stirred until the next day. An aliquot of 2.6243 g (10 mmol) of 2-(6-tert-butoxyhexyl)-5-(propan-2-ylidene)cyclopenta-1,3-diene previously synthesized was dissolved in THF and added dropwise to the lithiated mixture, and the solution was stirred overnight. 50 mL of water was added to the flask, quenched and worked up with ether and water. The organic layer was separated and then dried over $MgSO_4$. Thereby, 6.51 g (10.03 mmol, 100.3%) of the ligand was obtained.

NMR standard purity (wt %)=100%
Mw=649.04

The ligand synthesized above was added to a 250 mL schlenk flask dried in an oven and dissolved in ether, then 2.1 equivalents of n-BuLi solution was added thereto, and subjected to lithiation until the next day.

2.1 equivalents of $ZrCl_4(THF)_2$ was taken in a glove box and added to a 250 mL schlenk flask, and a suspension containing ether was prepared. The above two flasks were cooled down to −78° C., and then ligand anion was slowly added to the Zr suspension. After the addition was completed, the reaction mixture was slowly warmed up to room temperature. The ether solution was then filtered under argon and the filtered solid filter cake LiCl was removed. Then, the ether remaining in the filtrate was removed through vacuum-reduced pressure and hexane of volume equivalent to the previous solvent was added and subjected to recrystallization, but the catalyst precursor was soluble due to its high solubility in hexane. The hexane solvent was completely evaporated under vacuum-reduced pressure and the catalyst synthesis was confirmed by NMR. The yield and purity were confirmed by weighing and sampling in the glove box. Thereby, 6.66 g (8.23 mmol, 82.3% Yield) of red catalyst precursor was obtained.

NMR standard purity (wt %)=100%
Mw=809.16
$^1$H NMR (500 MHz, CDCl3): 1.13 (4H, m), 1.18 (20H, m), 1.35 (9H, m), 1.38 (11H, m), 1.54 (3H, s), 1.65-1.83 (9H, m), 3.33 (2H, m), 3.45 (2H, q), 3.98 (1H, s), 5.67, 5.98, 6.54, 6.97 (total 3H, s), 7.10 (1H, s), 7.41 (1H, s), 7.53 (1H, s), 7.63 (1H, s)

Preparation of Hybrid Supported Catalyst

Example 1

To a 300 mL glass reactor was added 50 mL of toluene solution, and then 10 g of silica (Grace Davison, SP2410) was added, and the mixture was stirred while raising the reactor temperature to 40° C. 60 mL of 10 wt % methylaluminoxane (MAO)/toluene solution (Albemarle) was added, warmed up to 60° C., and then stirred at 200 rpm for 12 hours. After the reactor temperature was lowered to room temperature, stirring was stopped, and the reaction solution was allowed to settle for 10 minutes and decanted.

50 mL of toluene was added to the reactor, 0.50 g of the catalyst precursor A and 10 mL of toluene solution were added to the reactor and stirred at 200 rpm for 60 minutes. 0.5 g of the catalyst precursor D and 10 mL of toluene solution were added to the reactor and stirred at 200 rpm for 12 hours. Stirring was stopped, and the reaction solution was allowed to settle for 30 minutes and decanted. To the reactor, 100 mL of hexane was added, hexane slurry was transferred to 250 mL schlink flask, and hexane solution was decanted. It was dried under reduced pressure at room temperature for 3 hours.

Example 2

To a 300 mL glass reactor was added 50 mL of toluene solution, and then 10 g of silica (Grace Davison, SP2410), the mixture was stirred while raising the reactor temperature to 40° C. 60 mL of 10 wt % methylaluminoxane (MAO)/toluene solution (Albemarle) was added, warmed up to 60° C., and then stirred at 200 rpm for 12 hours. After the reactor temperature was lowered to room temperature, stirring was stopped, and the solution was allowed to settle for 10 minutes and the toluene solution was decanted.

100 mL of toluene was added, and the mixture was stirred for 10 minutes. Stirring was stopped, and then the reaction solution was allowed to settle for 10 minutes and toluene solution was decanted. 50 mL of toluene was added to the reactor, 0.50 g of the catalyst precursor A and 10 mL of toluene solution were added to the reactor and stirred at 200 rpm for 60 minutes. 0.5 g of the catalyst precursor B and 10 mL of toluene solution were added to the reactor and stirred at 200 rpm for 12 hours. 0.5 g of the catalyst precursor D and 10 mL of toluene solution were added to the reactor and stirred at 200 rpm for 12 hours. Stirring was stopped, and then the reaction solution was allowed to settle for 10 minutes and decanted. To the reactor, 100 mL of hexane was added, hexane slurry was transferred to 250 mL schlink flask, and hexane solution was decanted. It was dried under reduced pressure at room temperature for 3 hours.

Example 3

A hybrid supported catalyst was prepared in the same manner as in Example 2, except that the catalyst precursor C was used instead of the catalyst precursor B in Example 2.

Example 4

A hybrid supported catalyst was prepared in the same manner as in Example 2, except that the catalyst precursor E was used instead of the catalyst precursor B in Example 2.

Comparative Example 1

Ziegler-Natta catalyst was prepared.

Comparative Example 2

A hybrid supported catalyst was prepared in the same manner as in Example 2, except that the catalyst precursor E was used instead of the catalyst precursor D in Example 1.

Experimental Example

Each of the catalysts prepared in Examples and Comparative Examples was weighed in a glove box, added to a 50 mL glass bottle. Then, the bottle was sealed with a rubber diaphragm and taken out of the glove box to prepare a catalyst to be added into the polymerization.

Polymerization was carried out in a 600 mL temperature-controllable metal alloy reactor which was equipped with a mechanical stirrer and available at high pressure. To this reactor were added 400 mL of hexane containing 1.0 mmol triethylaluminum, the catalysts prepared above without contact with air and 1-hexene was added at 80° C. Polymerization was carried out for 1 hour, while continuously providing a gaseous ethylene monomer and hydrogen monomer (0.3% relative to ethylene) at a pressure of 9 Kgf/cm$^2$. The termination of the polymerization was completed by first stopping the reaction and then removing the unreacted ethylene by evacuating. The obtained polymer product was filtered to remove the solvent and dried in a vacuum oven at 80° C. for 4 hours.

The physical properties of the obtained polymer were measured by the following methods.

1) Catalyst activity: The catalyst activity was determined by dividing the weight (kg) of the obtained polymer by the weight (g) of silica used.

2) Density: ASTM 1505

3) $MFR_{2.16}$: Measuring temperature 190° C., 2.16 kg load, ASTM 1238

4) $MFRR(MFR_{21.6}/MFR_5)$: MFRR was determined by dividing $MFR_{21.6}$ (measuring temperature 190° C., 21.6 kg load, ASTM 1238) by $MFR_5$ (measuring temperature 190° C., 5 kg load, ASTM 1238).

5) Mn, Mw, MWD: The sample was dissolved in 1,2,4-trichlorobenzene containing 0.0125% of BHT at 160° C. for 10 hours using PL-SP260 and subjected to pretreatment, and the number average molecular weight, and weight average molecular weight were measured by PL-GPC220 at 160° C. as a measuring temperature. The molecular weight distribution was represented by the ratio of the weight average molecular weight to the number average molecular weight.

6) Spiral flow length: The measurement was carried out by using ENGEL 150 ton injection machine and setting the mold thickness to 1.5 mm, the injection temperature to 190° C., the mold temperature to 50° C., and the injection pressure to 90 bar.

The results are shown in Table 1 below.

TABLE 1

| | Catalyst | Catalytic activity (kgPE/gSiO$_2$) | Density (g/cm$^3$) | MFR$_{2.16}$ (g/10 min) | MFRR | Molecular weight | Molecular weight distribution | Spiral Flow (cm) |
|---|---|---|---|---|---|---|---|---|
| Example 1 | A/D | 6.3 | 0.951 | 0.17 | 6.7 | 140K | 10.6 | 15.2 |
| Example 2 | A/B/D | 6.8 | 0.952 | 0.12 | 7.2 | 98K | 10.8 | 16.5 |
| Example 3 | A/C/D | 7.1 | 0.952 | 0.22 | 7.3 | 170K | 10.7 | 16.9 |
| Example 4 | A/D/E | 5.6 | 0.955 | 0.05 | 5.9 | 200K | 10.5 | 13.8 |

TABLE 1-continued

| | Catalyst | Catalytic activity (kgPE/gSiO$_2$) | Density (g/cm$^3$) | MFR$_{2.16}$ (g/10 min) | MFRR | Molecular weight | Molecular weight distribution | Spiral Flow (cm) |
|---|---|---|---|---|---|---|---|---|
| Comparative Example 1 | Z/N | — | 0.952 | 0.89 | 3.9 | 150K | 10.2 | 12.5 |
| Comparative Example 2 | A/E | 5.3 | 0.954 | 2.00 | 3.4 | 85K | 9.8 | 10.0 |

The invention claimed is:

1. An ethylene/1-hexene copolymer having the following features:
    a weight average molecular weight is 90,000 to 300,000;
    a density (g/cm$^3$) is 0.950 to 0.965;
    a molecular weight distribution is 5 to 20;
    a MFR$_{2.16}$ measured by ASTM 1238 under a load of 2.16 kg at 190° C. is 0.01 to 0.3 g/10 min;
    a melt flow rate ratio of MFR$_{21.6}$/MFR$_5$, measured by ASTM 1238 at 190° C., is 3 to 10; and
    a spiral flow length (cm) is 15 to 20, wherein the spiral flow length is evaluated by injecting the copolymer by applying a specific injection pressure and injection temperature to a spiral mold, and determining how much the molten and injected copolymer is pushed out, wherein the spiral mold has a thickness of 1.5 mm, the injection temperature is 190° C. a mold temperature is 50° C., and the injection pressure is 90 bar.

2. The ethylene/1-hexene copolymer of claim 1, wherein the molecular weight distribution is 10 to 15.

3. The ethylene/1-hexene copolymer of claim 1, wherein the melt flow rate ratio is 4 to 8.

4. The ethylene/1-hexene copolymer of claim 1, wherein the ethylene/1-hexene copolymer is prepared by copolymerizing ethylene and 1-hexene in the presence of a catalyst composition comprising a compound represented by the following Chemical Formula 1:

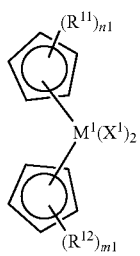

in Chemical Formula 1,
M$^1$ is a Group 4 transition metal;
X$^1$ is each independently halogen, C$_{1-20}$ alkyl, C$_{2-20}$ alkenyl, C$_{6-20}$ aryl, nitro, amido, C$_{1-20}$ alkylsilyl, C$_{1-20}$ alkoxy, or C$_{1-20}$ sulfonate;
n1 and m1 are each independently an integer of 1 to 4; and
R$^{11}$ and R$^{12}$ are each independently hydrogen, C$_{1-20}$ alkyl, C$_{1-10}$ alkoxy, C$_{2-20}$ alkoxyalkyl, C$_{6-20}$ aryl, C$_{6-10}$ aryloxy, C$_{2-20}$ alkenyl, C$_{7-40}$ alkylaryl, C$_{7-40}$ arylalkyl, C$_{8-40}$ arylalkenyl, or C$_{2-10}$ alkynyl; with the proviso that at least one of R$^{11}$ is C$_{2-20}$ alkoxyalkyl.

5. The ethylene/1-hexene copolymer of claim 4, wherein the catalyst composition further comprises one or more of compounds represented by the following Chemical Formulas 2 to 4:

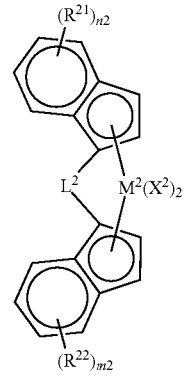

in Chemical Formula 2,
M$^2$ is a Group 4 transition metal;
X$^2$ is each independently halogen, C$_{1-20}$ alkyl, C$_{2-20}$ alkenyl, C$_{6-20}$ aryl, nitro, amido, C$_{1-20}$ alkylsilyl, C$_{1-20}$ alkoxy, or C$_{1-20}$ sulfonate;
L$^2$ is C$_{1-10}$ alkylene;
n2 and m2 are each independently an integer of 1 to 4; and
R$^{21}$ and R$^{22}$ are each independently hydrogen, C$_{1-20}$ alkyl, C$_{1-10}$ alkoxy, C$_{2-20}$ alkoxyalkyl, C$_{6-20}$ aryl, C$_{6-10}$ aryloxy, C$_{2-20}$ alkenyl, C$_{7-40}$ alkylaryl, C$_{7-40}$ arylalkyl, C$_{8-40}$ arylalkenyl, or C$_{2-10}$ alkynyl,

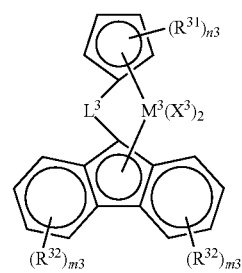

in Chemical Formula 3,
M$^3$ is a Group 4 transition metal;
X$^3$ is each independently halogen, C$_{1-20}$ alkyl, C$_{2-20}$ alkenyl, C$_{6-20}$ aryl, nitro, amido, C$_{1-20}$ alkylsilyl, C$_{1-20}$ alkoxy, or C$_{1-20}$ sulfonate;
L$^3$ is Si(R$^{34}$)(R$^{35}$), wherein R$^{34}$ and R$^{35}$ are each independently C$_{1-20}$ alkyl, or C$_{1-10}$ alkoxy;
n3 and m3 are each independently an integer of 1 to 4; and
R$^{31}$ and R$^{32}$ are each independently hydrogen, C$_{1-20}$ alkyl, C$_{1-10}$ alkoxy, C$_{2-20}$ alkoxyalkyl, C$_{6-20}$ aryl, C$_{6-10}$ to aryloxy, C$_{2-20}$ alkenyl, C$_{7-40}$ alkylaryl, C$_{7-40}$ arylalkyl, C$_{8-40}$ arylalkenyl, or C$_{2-10}$ alkynyl,

[Chemical Formula 4]

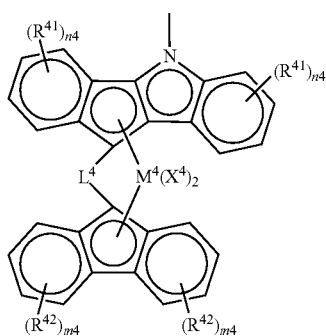

in Chemical Formula 4,
$M^4$ is a Group 4 transition metal;
$X^4$ is each independently halogen, $C_{1-20}$ alkyl, $C_{2-20}$ alkenyl, $C_{6-20}$ aryl, nitro, amido, $C_{1-20}$ alkylsilyl, $C_{1-10}$ alkoxy, or $C_{1-20}$ sulfonate;
$L^4$ is $Si(R^{44})(R^{45})$, wherein $R^{44}$ and $R^{45}$ are each independently $C_{1-20}$ alkyl, or $C_{1-10}$ alkoxy, with the proviso that at least one of $R^{44}$ and $R^{45}$ is 6-(tert-butoxy)hexyl;
n4 and m4 are each independently an integer of 1 to 4; and
$R^{41}$ and $R^{42}$ are each independently hydrogen, $C_{1-20}$ alkyl, $C_{1-10}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, $C_{7-40}$ arylalkyl, $C_{8-40}$ arylalkenyl, or $C_{2-10}$ alkynyl.

6. The ethylene/1-hexene copolymer of claim 4, wherein the catalyst composition further comprise a compound represented by the following Chemical Formula 5:

[Chemical Formula 5]

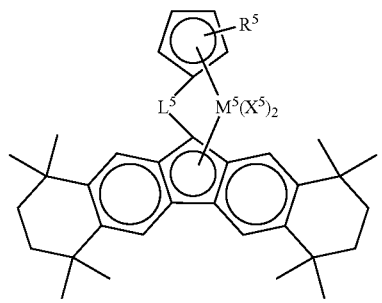

in Chemical Formula 5,
$M^5$ is a Group 4 transition metal;
$X^5$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;
$L^5$ is $C_{1-10}$ alkylene; and
$R^5$ is $C_{1-10}$ alkoxy.

* * * * *